US009733698B1

(12) United States Patent
Schmitz (10) Patent No.: US 9,733,698 B1
(45) Date of Patent: Aug. 15, 2017

(54) SYSTEM AND METHOD FOR ENABLING A USER TO CREATE AND POST POLLS ON A MICROBLOGGING WEBSITE THAT CAN BE ANSWERED ON THE MICROBLOGGING WEBSITE

(75) Inventor: Michael David Schmitz, Littleton, CO (US)

(73) Assignee: Wayin, Inc., Denver, CO (US)

( * ) Notice: Subject to any disclaimer, the term of this patent is extended or adjusted under 35 U.S.C. 154(b) by 150 days.

(21) Appl. No.: 13/435,692

(22) Filed: Mar. 30, 2012

(51) Int. Cl.
*G06F 17/30* (2006.01)
*G06F 15/16* (2006.01)
*G06F 3/01* (2006.01)

(52) U.S. Cl.
CPC ............... *G06F 3/01* (2013.01); *G06F 15/16* (2013.01)

(58) Field of Classification Search
CPC ......... G06F 17/30; G06F 15/16; G06Q 10/10; H04L 29/08
USPC ........................................................ 709/204
See application file for complete search history.

(56) References Cited

U.S. PATENT DOCUMENTS

| 2012/0079396 A1* | 3/2012 | Neer et al. ............ 715/745 |
| 2012/0197984 A1* | 8/2012 | Rao ............... G06Q 10/107 709/203 |
| 2013/0174055 A1* | 7/2013 | Johnson et al. ........ 715/753 |

* cited by examiner

*Primary Examiner* — Vivek Srivastava
*Assistant Examiner* — Sibte Bukhari
(74) *Attorney, Agent, or Firm* — Lessani Law Group, PC (57) ABSTRACT

A polling system and method is provided for enabling a user to create polls that are posted on a microblogging website and that can be answered on the microblogging website. The method includes obtaining the user's login information for the microblogging system. The user is able to create a poll that includes a question. A microblog post is generated for the poll. The microblog post is sent to the microblogging system to post on a website. Other users on the microblogging system are able to respond to the poll within the microblogging system by replying to the user's microblog post with another post that includes an answer choice for the poll. The microblogging system is queried for posts directed to the user (e.g., reply posts to the user). A second microblog post is created with poll results and sent to the microblogging system to post on the website.

23 Claims, 10 Drawing Sheets

SYSTEM AND METHOD FOR ENABLING A USER TO CREATE AND POST POLLS ON A MICROBLOGGING WEBSITE THAT CAN BE ANSWERED ON THE MICROBLOGGING WEBSITE

BACKGROUND OF THE INVENTION

1. Field of the Invention

This invention relates generally to a polling system and, more particularly, to a system and method for enabling a user to create and post polls on a microblogging website that can be answered on the microblogging website.

2. Description of the Background Art

Microblogging has become increasingly more prevalent in today's technologically interconnected world. Microblogging can take the form of traditional blogging, where microbloggers post about topics that concern them from what they did that day to their views on subject matters of import. Commercial microblogs may promote websites, services, or products or encourage interactivity with the organization. Microblogs may operate through a web-based interface, through text messaging, instant messaging, email, or digital audio.

One example of a microblogging system is TWITTER. TWITTER allows its users to send and read text-based posts, or "Tweets," that contain 140 characters or less. A user can follow (or be followed by) other users on TWITTER, which means that the user subscribes to the other user's Tweets. While the user may ask a question in his or her Tweet to jumpstart a conversation about a certain subject matter among his or her followers, there is currently no system in place for processing the responses that the user receives and providing feedback to the general community (or at least to the user's followers) within TWITTER.

Currently, if a user wants to take a poll and have the answers compiled into poll results, a user posts or "tweets" a link to a poll on an external website (i.e., outside TWITTER or other microblogging systems). If followers of the user click on the link to take the poll, they are taken to the external website. The user's followers may then have to search for the poll on the external website. Sometimes, the followers even have to register on the third party website before they can take the poll. All of this is inconvenient and decreases the likelihood that followers will actually participate in a poll. Therefore, there is a need for a system and method for enabling a user to create and post polls on a microblogging website, such as TWITTER, that can be answered without leaving the microblogging website.

SUMMARY OF THE INVENTION

The present invention is directed to a polling system and method for enabling a user to create polls that are posted on a microblogging website and that can be answered on the microblogging website. The method includes obtaining the user's login information for an external microblogging system. The user is enabled to create a poll by submitting a question/inquiry and corresponding answer options (if any). A microblog post is generated for the poll. The microblog post is sent to the microblogging system to post under the user's account on a website associated with the microblogging system. Other users on the microblogging system are able to respond to the poll within the microblogging system by replying to the user's microblog post with another post that includes an answer choice. The microblogging system is queried for posts directed to the user, and the requested posts are received and parsed by the polling system to obtain poll responses. A second microblog post is created with poll results. The second microblog post is sent to the microblogging system to post under the user's account in the microblogging website.

In certain embodiments, the user is able to set a duration for the poll. The second microblog post is then sent after the expiration of the poll and includes the final poll results.

In certain embodiments, when the polling system creates the microblog post, it converts the answer options into a form that enables them to be easily searched on the microblogging system. For example, this may include removing spaces and symbols and adding a subject matter marker. An example of a subject matter marker is the hashtag on TWITTER.

In certain embodiments, the received posts are parsed to identify responses that are sent to the user within the duration of the poll and that that include one of the answer options and a corresponding subject matter marker. After the poll is posted, the polling system may periodically query the microblogging system for responses to the poll until the poll is expired. In certain embodiments, interim poll results are posted on a website associated with the polling system prior to the expiration of the poll. In other embodiments, interim poll results are posted on the microblogging website prior to the expiration of the poll.

In certain embodiments, the polling system provides a user interface via which a second user is able to re-post the poll under the second user's account in the microblogging system. In response to the second user electing to re-post the poll, the polling system may resend the microblog post to the microblogging system to post under the second user's account in the microblogging system. The polling system may also provide a user interface via which the user is able to search for a photo, video, audio file, or other multimedia to associate with the poll, and, in response to the user associating a photo, video, audio file, or other multimedia with the poll, the photo, video, audio file, or other multimedia may be included in the microblog post.

In certain embodiments, the poll is in the form of a multiple-choice question. In other embodiments, the poll is in the form of a request for a rating of a subject matter between a first number and a second number. In still other embodiments, the question is open-ended.

DETAILED DESCRIPTION OF THE PREFERRED EMBODIMENTS

The present invention provides a system and method for enabling a user to create and post polls on a microblogging website that can be answered on the microblogging website. As used herein, a "poll" is any question or inquiry that prompts the user for an answer and for which answers will be tracked. A poll is not limited to opinion-based questions. Examples of question/answer types in a poll include multiple choice, true/false, right/wrong, request for numerical rating, and open-ended.

Figure 1A:
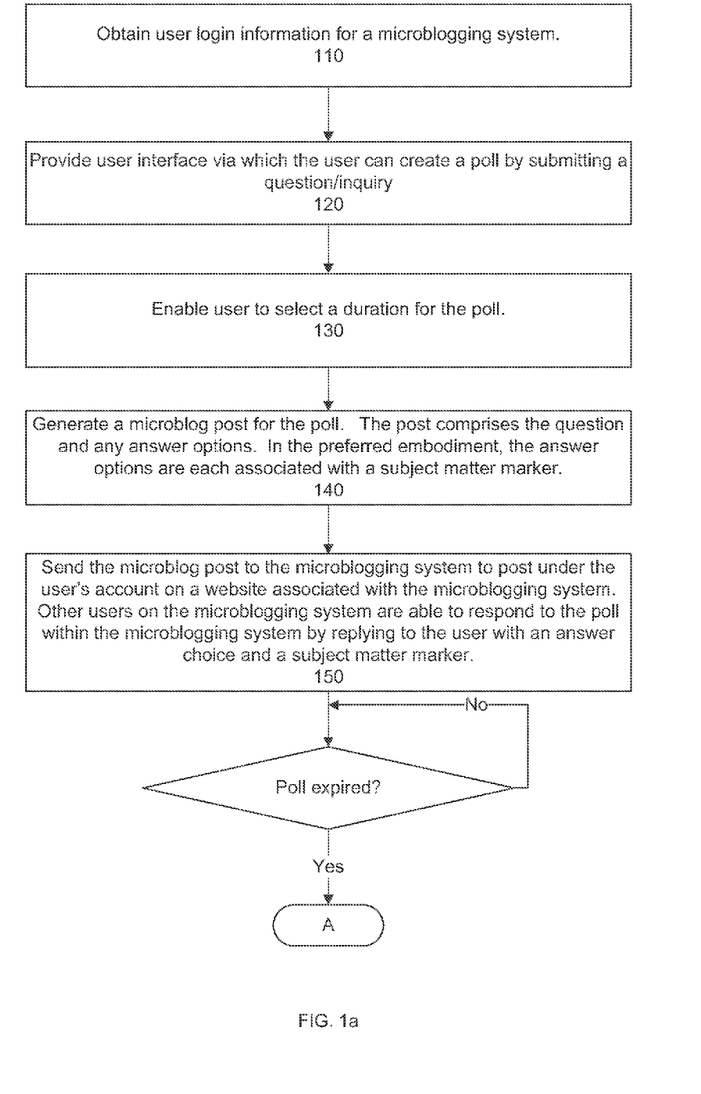
FIGS. 1a-1b are a flowchart that illustrates a method for enabling a user to create and post polls on a microblogging website that can be answered on the microblogging website.
Figure 1B:
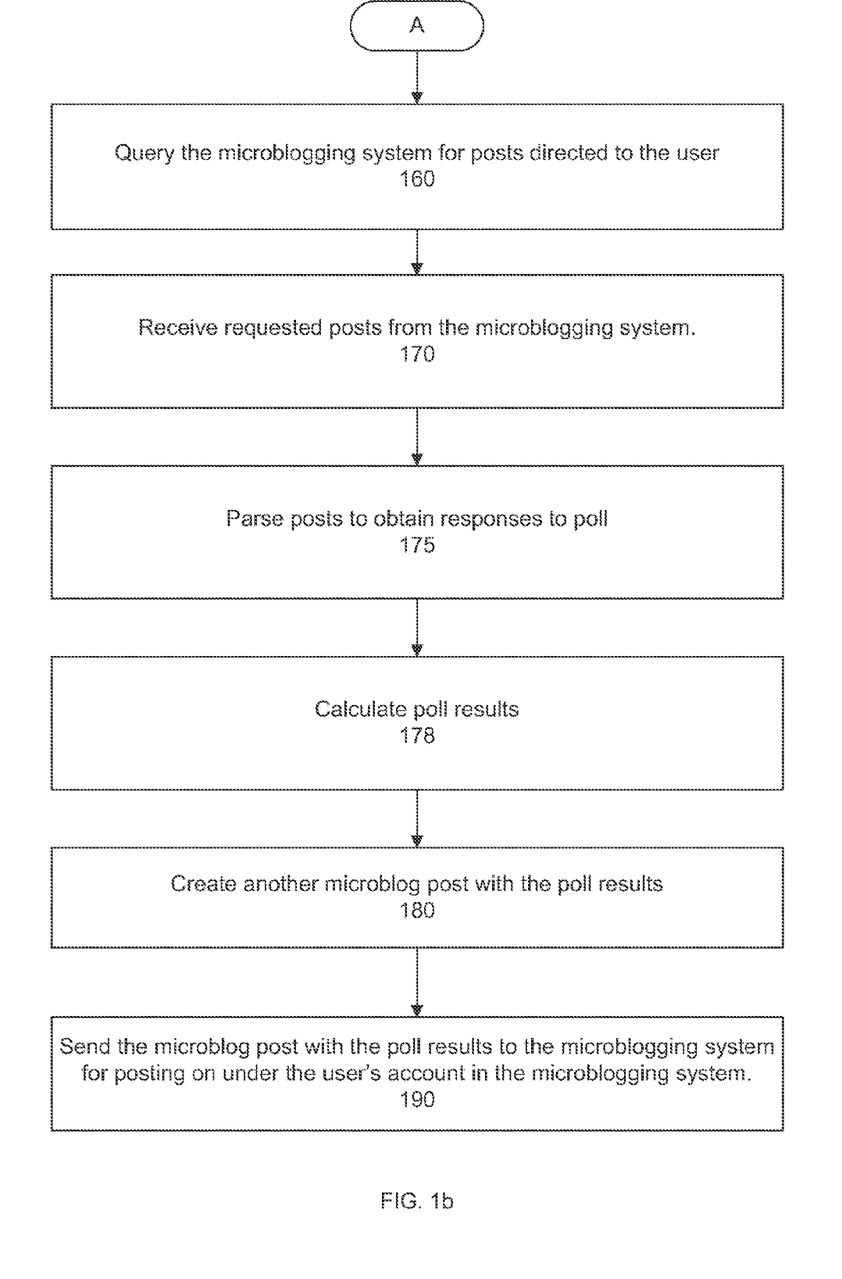

In a preferred method, shown in FIGS. 1*a*-1*b*, the polling system obtains user login information for a microblogging system, such as for example TWITTER (step 110). The polling system then provides a user interface via which the user can create a poll by submitting a question/inquiry (step 120). If the poll is a multiple choice question or other question for which answer options are provided, the user interface enables the user to specify the answer options.

The user is then able to select a duration for the poll (step 130). The duration may be for 10 minutes, 30 minutes, 1 hour, or any other time frame. The polling system then generates a microblog post for the poll (step 140). The post includes the question, as well as any answer options specified by the user. In one embodiment, the answer options are each associated with a subject matter marker. For example, if the microblog posts are posted on TWITTER, each answer option may be associated with a hashtag. Also, the spaces between words and any symbols in the answer options may be removed. This increases the ease at which the microblogging system may be searched for the answer options. For instance, a poll on TWITTER may look like "Which actor do you prefer? #MattDamon #SeanConnery". If such poll is posted on TWITTER, search results for "MattDamon" on TWITTER will include the above-described example poll.

The microblog post is then sent to the microblogging system to post under the user's account on a website associated with the microblogging system (step 150). In order to post the poll under the user's account, the polling system passes the login information obtained in step 110 to the microblogging system. Once the poll is posted, other users on the microblogging system are able to respond to the poll within the microblogging system by replying to the user with a response to the poll (i.e., by submitting a reply post to the user). For polls with answer options, a valid response must include one of the answer options. In one embodiment, the answer must be associated with a subject matter marker.

When the poll has expired, or the duration of the poll has elapsed, the polling system will query the microblogging system for posts directed to the user (step 160). For example, a query in TWITTER may take the form of a "GET search" where the parameter "q=@usershandle" is passed to the system. The polling system then receives the requested posts from the microblogging system (step 170), and parses the posts to identify those that are responses to the poll (step 175). For polls with answer options, this includes parsing the posts for one of the answer options. Posts that are outside the specified time frame for the poll are eliminated. In the preferred embodiment, a valid response to a poll must associate a subject matter marker with an answer option, and, in such case, posts sent to the user during the duration of the poll are parsed to identify those that have one of the answer options and a corresponding subject matter marker. For instance, in the example poll described above (i.e., "Which actor do you prefer? #Matt Damon #Sean Connery"), the polling system would parse reply posts to the user for those that were sent within the duration of the poll and that have either "#MattDamon" or "#SeanConnery" in the text of the post. In an alternate embodiment, the search query to the microblogging system includes parameters for the content of the post and time of the post, and, in such case, the polling system may receive from the microblogging system only those reply posts to the user that are within the duration of the poll and that have an answer option and a corresponding subject matter marker. In this embodiment, the polling system would not have to parse through all posts to the user to obtain poll responses.

The poll results are calculated based on the aggregate poll responses obtained from both the parsed posts and any other site on which users can respond to the poll (step 178). The polling system then creates another microblog post with the poll results (step 180). The microblog post with the poll results is sent to the microblogging system for posting on the user's account in the microblogging system (step 190). The poll results may be presented textually, graphically (e.g., bar graphs, pie charts, etc.), through audio files, or through a combination of multimedia. In certain embodiments, the second microblog post, including the final poll results, is sent to the microblogging system after the expiration of the poll duration.

In certain embodiments, the polling system periodically queries the microblogging system until the expiration of the poll for reply posts to the user. The responses to the periodic queries are received from the microblogging system. In certain cases, the polling system will filter out overlapping responses from the periodic queries. In other cases, the polling system will send out another query to fill in gaps in the responses received from the periodic queries. The interim poll results are then posted on one or more of the polling system and microblogging system prior to the expiration of the poll. For example, the interim poll results may be posted next to the original poll post on the microblogging website and the user is enabled to see the interim poll results as soon as he or she votes on the poll.

In certain embodiments, the polling system provides a user interface via which a second user is able to re-post the poll under the second user's account in the microblogging system. For example, the polling system may enable a user to "retweet" a poll on TWITTER. In response to the second user electing to re-post the poll, the polling system resends the microblog post to the microblogging system to post under the second user's account in the microblogging system.

In certain embodiments, the polling system provides a user interface via which the user is able to search for a photo to associate with the poll, and, in response to the user associating a photo with the poll, such photo is included in the microblog post. In other embodiments, the user interface allows the user to search for videos, audio files, and other multimedia to associate with the poll. In response to the user associating the video, audio file, or other multimedia with the poll, such video, audio file, or other multimedia is included in the microblog post.

In certain embodiments, instead of a multiple-choice question, the user is presented with a request to rate a subject matter with a value between a first number and a second number. For example, the user may be asked to rate a newly released movie between 1 and 100 or the user's view on a ballot issue between 1 and 25. The polling system will then query the microblogging system for the responses to the original poll and parse the responses for the subject matter marker and the number rating (e.g., #23). The polling system may then present the poll results based on how many responses fall between intervals of numbers. For example, for responses to the request to rate a newly released movie between 1 and 100, the poll results may be calculated for each interval of 10 (i.e., 1-10, 11-20, 21-30, etc.).

In other embodiments, the user may be asked an open-ended question. For example, the user may be asked his or her fantasy football player picks. The polling system may then query the microblogging system for the responses to the user's poll. The responses are then parsed and the poll results calculated based in part on the queried responses and in part based on the players' performance that week (e.g., football yards gained, touchdowns, penalties, etc.). Any number of algorithms may be used in the calculation step within the scope of the present invention. In certain embodiments with regard to open-ended questions, the poll results may be presented only for answer options over a certain percentage (e.g., 25%, 50%, 75%, etc.) or only for answer options that have certain permissible terms (e.g., a name of a football player).

Figure 2:
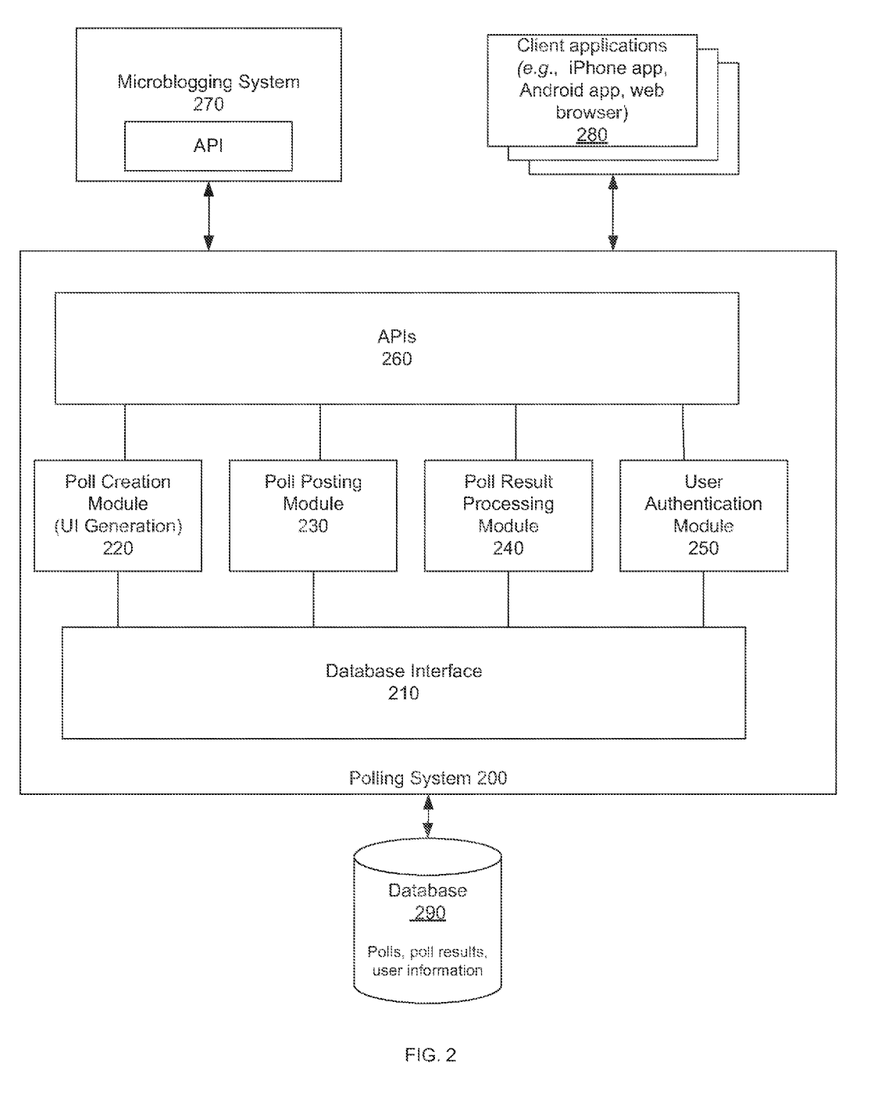
FIG. 2 is a block diagram of an exemplary software architecture for a polling system according to one embodiment of the invention.

FIG. 2 illustrates an exemplary system architecture for a Polling System 200. As a person skilled in the art would understand, the system architecture may be constructed in any number of ways, having more or less modules and different interconnectivity, within the scope of the present invention. The methods of FIGS. 1a-1b may be implemented in other systems, and the invention is not limited to system 200.

The Polling System 200 has a Database Interface 210, a Poll Creation Module (User Interface Generation) 220, a Poll Posting Module 230, a Poll Result Processing Module 240, a User Authentication Module 250, and Application Programming Interfaces (APIs) 260.

The Database Interface 210 functions to store polls, poll results, and user information into one or more Databases 290. The Poll Creation Module 220 provides the user interface via which the user can create a poll. The Poll Posting Module 230 converts the information in the user interface into a format compatible with the Microblogging System 270. For example, the Poll Posting Module 230 may remove spaces and symbols and add a hashtag to the poll creator's answer options. The Poll Result Processing Module 240 receives the reply posts from the query of the Microblogging System 270, parses the replies for poll responses, and calculates the poll results. The Poll Result Processing Module 240 may also use any number of algorithms to calculate the poll results within the scope of the present invention. The User Authentication Module 250 authenticates the user in the Polling System 200. The user's password, or other identifying information, may be the same as his or her username and password for the Microblogging System 270, or it may be different.

The Microblogging System 270 is an external system that interfaces through its Application Programming Interface with the APIs 260 of the Polling System 200. The Polling System 200 posts polls on the Microblogging System 270, sends queries to the Microblogging System 270, and receives back the replies to the user's poll post. After the Polling System 200 processes the replies in the Poll Result Processing Module 240 by parsing the replies based on subject matter markers and answer options, the Polling System 200 sends back a second post to the Microblogging System 270 containing a summary of the poll results. In certain embodiments, the Microblogging System 270 may also post interim poll results next to the original poll post as soon as a user responds to the original poll post.

Client Applications 280 provide a user interface via which users can create, view, and respond to polls. The Client Applications 280 may be run on any number of systems and may connect to the Polling System 200 through any number of channels. For example, the Client Applications 280 may include iPhone applications, Android applications, web browsers, or many others and may connect via the internet, a cellular network, or any other communication network.

The method described with respect to FIGS. 1a-1b are embodied in software and performed by a computer system executing the software. A person skilled in the art would understand that a computer system has a memory or other physical storage medium for storing software instructions and one or more processors for executing the software instructions.

Figure 3:
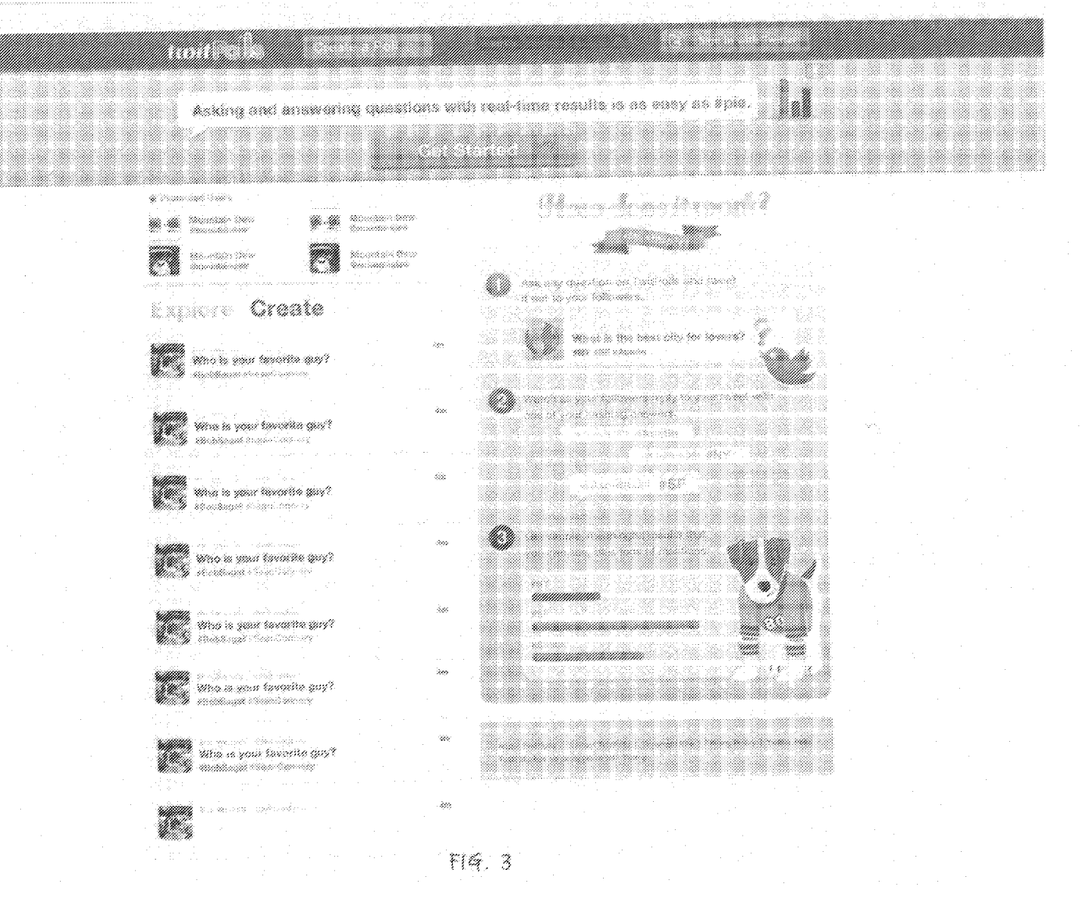
FIG. 3 is a screenshot of an exemplary user interface in a polling system according to one embodiment of the invention.

FIGS. 3-7 illustrate screenshots of an exemplary polling system website. A person skilled in the art would understand that the present invention may be embodied on other user interfaces having more or less functionality within the scope of the present invention. As such, FIGS. 3-7 are intended to be illustrative and not limiting in any way. In FIG. 3, a homepage of a website where users can view, create, and respond to polls or view poll results is shown.

Figure 4:
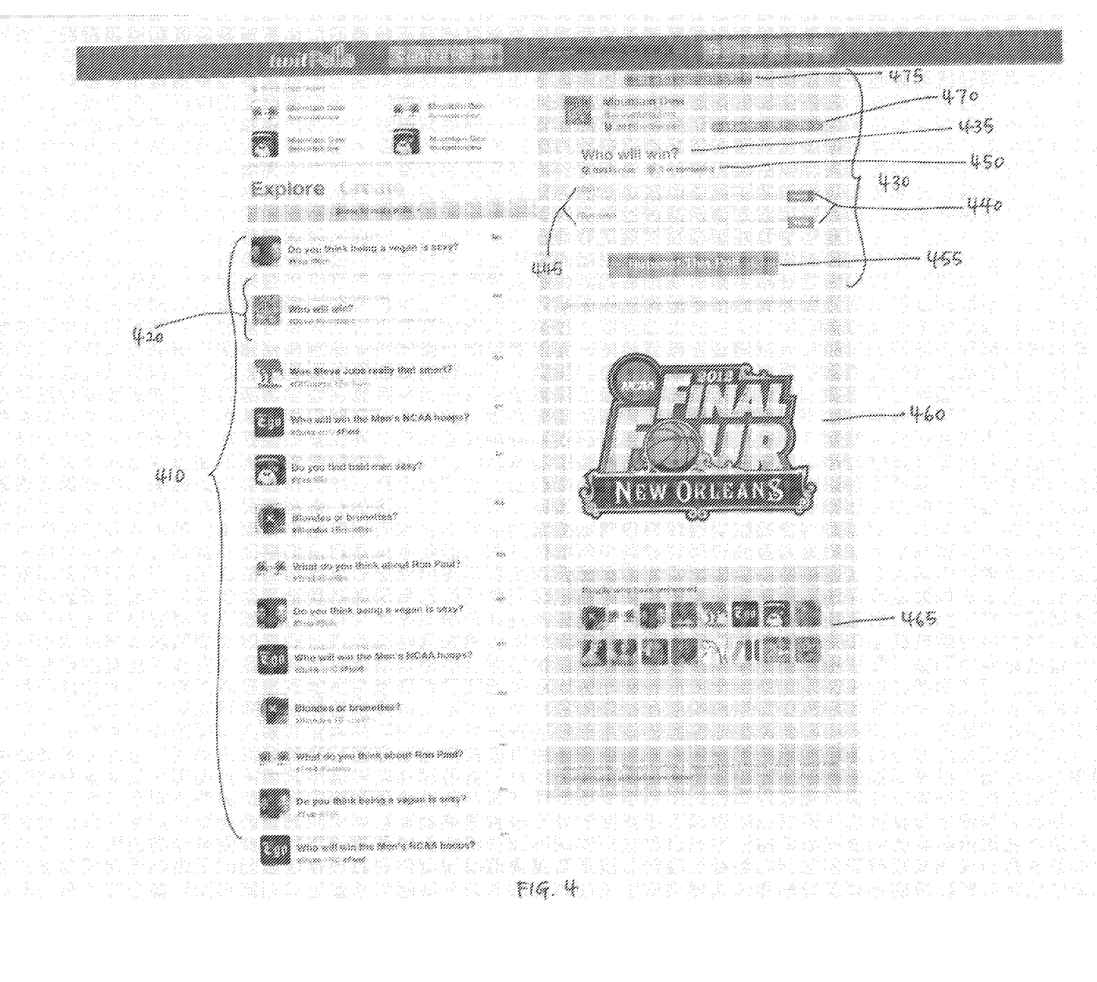
FIG. 4 is another screenshot of an exemplary user interface in a polling system according to one embodiment of the invention.

FIG. 4 illustrates another screenshot in which a user of the polling system can explore polls created by other users. The user interface lists a number of polls for viewing by the user 410. This list may be the most popular polls, sponsored polls, polls the user has previously clicked, or polls that may be of interest to the user based on the user's profile information, etc. When the user clicks on a particular poll 420, the poll populates a window 430 on the user interface and includes the question 435 and 2 or more answer options that may be selected, or voted upon, by the user 440. If the user chooses to vote for one of the answer options from the user interface of the polling system, he or she may click on a voting button 440. (In the alternative, the user may vote directly from the microblogging website by replying to the original post with an answer option and a subject matter marker.) The user interface may also include a graphical view of the interim poll results 445, the time remaining for poll system users to respond to the poll question 450, a button to allow a user to re-post (e.g., "retweet") the poll within the microblogging system (e.g., TWITTER) 455, a picture associated with the poll question 460, and an indication of the other users who have responded to the selected poll 465.

If the user clicks on the button 470 directing the user to "more games from this user," he or she will be directed to a webpage showing a list of polls created by a particular user. The list may be ordered based on the n most recent polls or the n most popular polls in terms of viewing or responding. The user may also click on the button 475 that directs the user to the full question details of a poll. The user would then be directed to a webpage, such as shown in and described with regard to FIG. 7.

Figure 5:
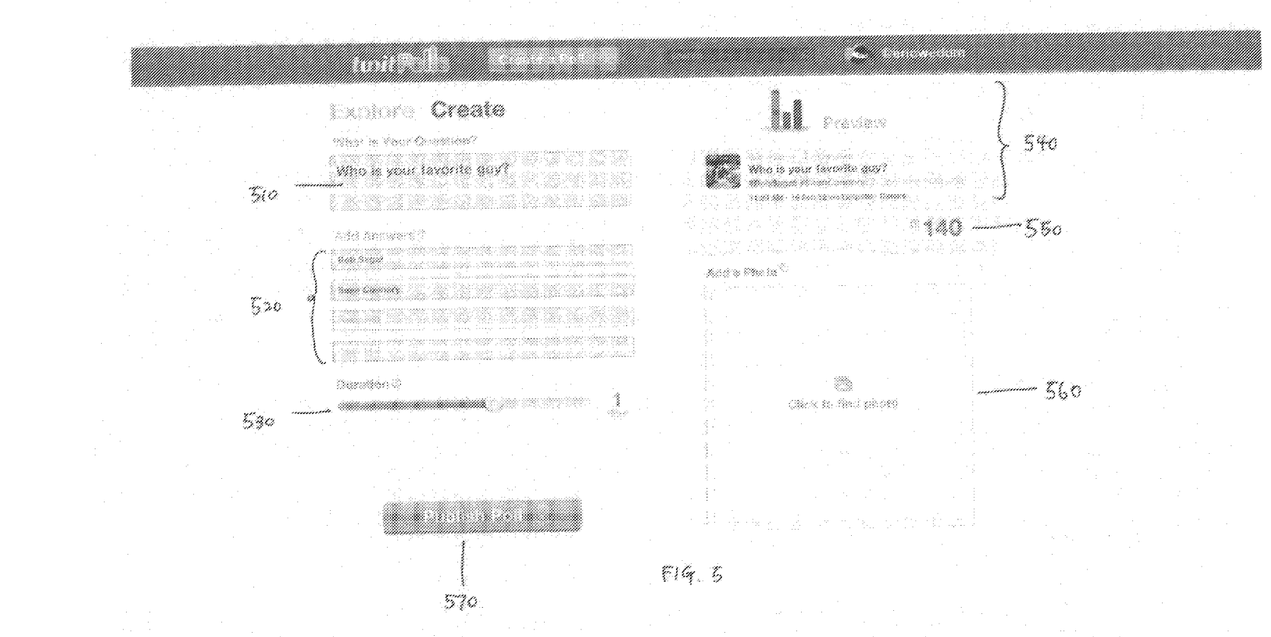
FIG. 5 is another screenshot of an exemplary user interface in a polling system according to one embodiment of the invention.

FIG. 5 illustrates another screenshot in which a user of the polling system can create polls for other users to respond to. The user interface includes a field for the user to type his or her question 510. The user may then insert 2 or more answer options into the answer fields 520 using standard language syntax. While the present user interface indicates a maximum of 4 answer options, the invention may be configured to accept any of 2 to n answer options. In addition, in certain embodiments, when a user asks other users to rate a particular subject matter or respond to an open-ended question, the answer fields may be left blank. As previously discussed, the polling system converts the answer options into a form that is compatible with the searching functionality of the microblogging system. For example, in FIG. 5, the spaces are removed from the answer options "Bob Sagat" and "Sean Connery" and a hash tag is added to increase searchability. In certain embodiments, symbols may also be removed from the answer options.

The user then has the option of setting the duration for accepting responses to the poll question 530. In this particular user interface, the duration may be up to one hour, but the invention may be configured to accept any of 0 to n minutes. The user may preview his or her poll 540. As the illustrated poll is intended to be compatible with a microblogging system, such as TWITTER, the question and answer options must be equal to or less than 140 characters. The polling interface provides an indicator 550 that lets the user know how many characters have been used or how many characters are still available for the post. If the user goes over the 140 characters count, the indicator may indicate that there are a negative number of characters available. The user may also add a photograph or other graphic to their post 560. In other embodiments, the user may add videos, audio files, or other multimedia clips. When the user is satisfied with his or her poll, he or she may click on the Publish Poll button 570, which publishes the poll and starts the timer for the period that the poll is available for response.

In certain embodiments, when the user attempts to publish his or her poll, the user will receive an error message indicating that one or more of the answer choices are currently being used in another active poll created by the user. In which case, the user can then choose whether to close the older poll or change the one or more answer options.

Figure 6:
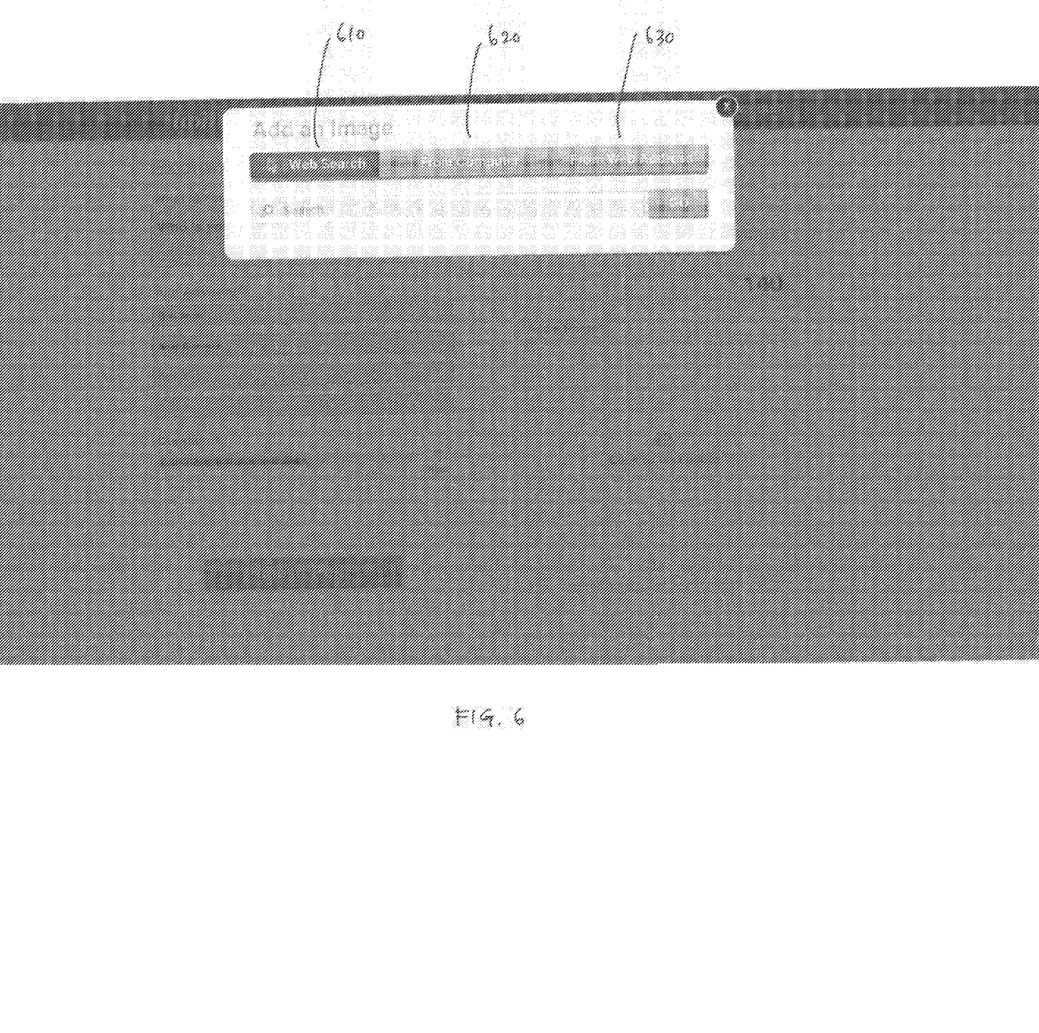
FIG. 6 is another screenshot of an exemplary user interface in a polling system according to one embodiment of the invention.

FIG. 6 illustrates a screenshot that a user may view if he or she elects to add an image to the poll post. According to one embodiment, the user will have 3 search options. First, the user may perform a web search by entering search terms into the provided field 610. The web search engine then culls the internet for the requested image. For example, if a user searches for "dog," the search engine will return a plurality of images showing a dog from around the internet. Once the user selects an image, the user may then be presented with a confirmation screen where he or she may be asked whether he or she would like to use the image or go back to the search results. In another embodiment, the user may search for images on his or her computer 620 or from a particular web address 630.

Figure 7:
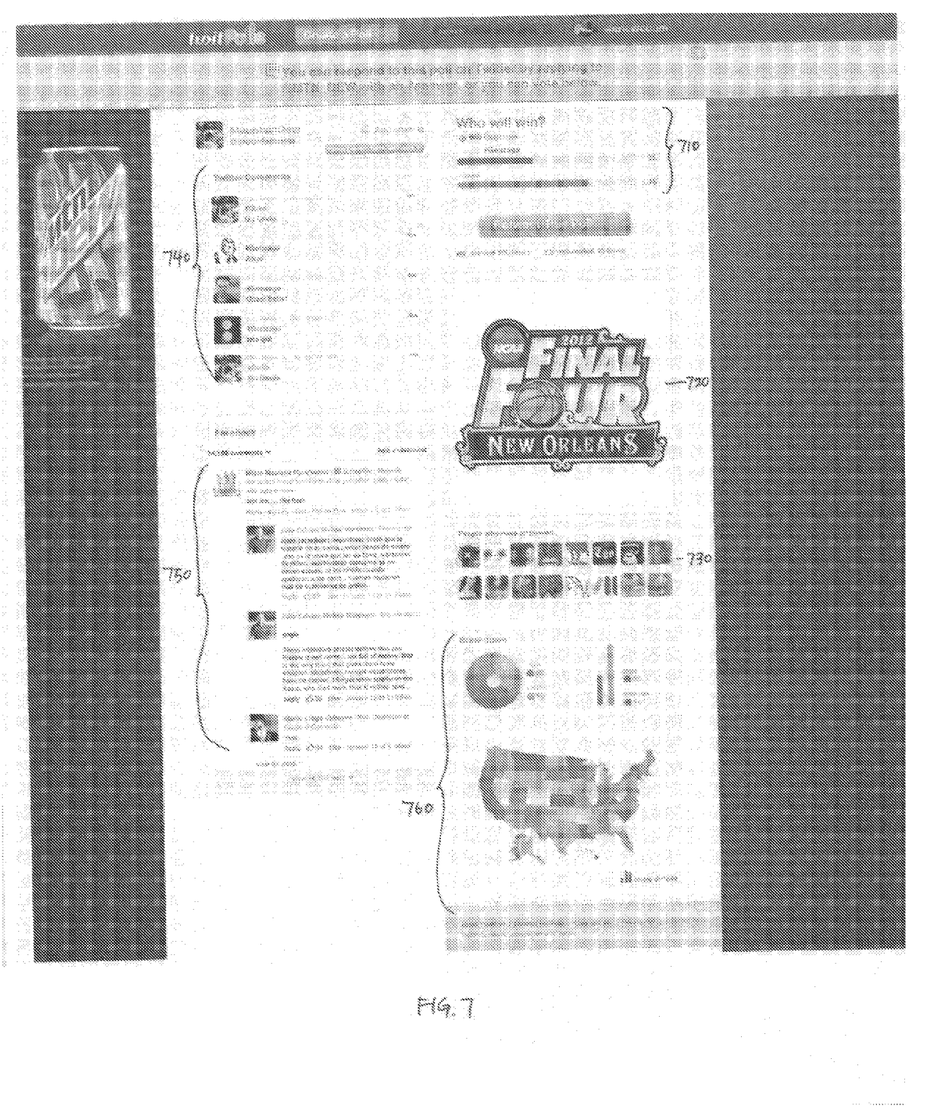
FIG. 7 is another screenshot of an exemplary user interface in a polling system according to one embodiment of the invention.

FIG. 7 illustrates a webpage containing detailed information related to a particular poll. For example, it has the question and answer options, as well as the number (and graphical display) of votes for each answer option 710. It displays a photograph or image associated with the question 720 and the people who have responded to the question 730. In addition, FIG. 7 includes a comment section 740 for the microblogging system for those users who desire to add a public comment to their reply in addition to their vote. This webpage also includes a comment section for other social networking sites 750, such as FACEBOOK. A person skilled in the art would understand that the poll created by the polling system may be embedded within other social networking sites and receive responses through other social networking sites within the scope of the present invention. This webpage also includes a statistics section 760. For example, the polling system may analyze and display a chart of the responses by geographical region, gender, occupation, school or company affiliation, etc.

Figure 8:
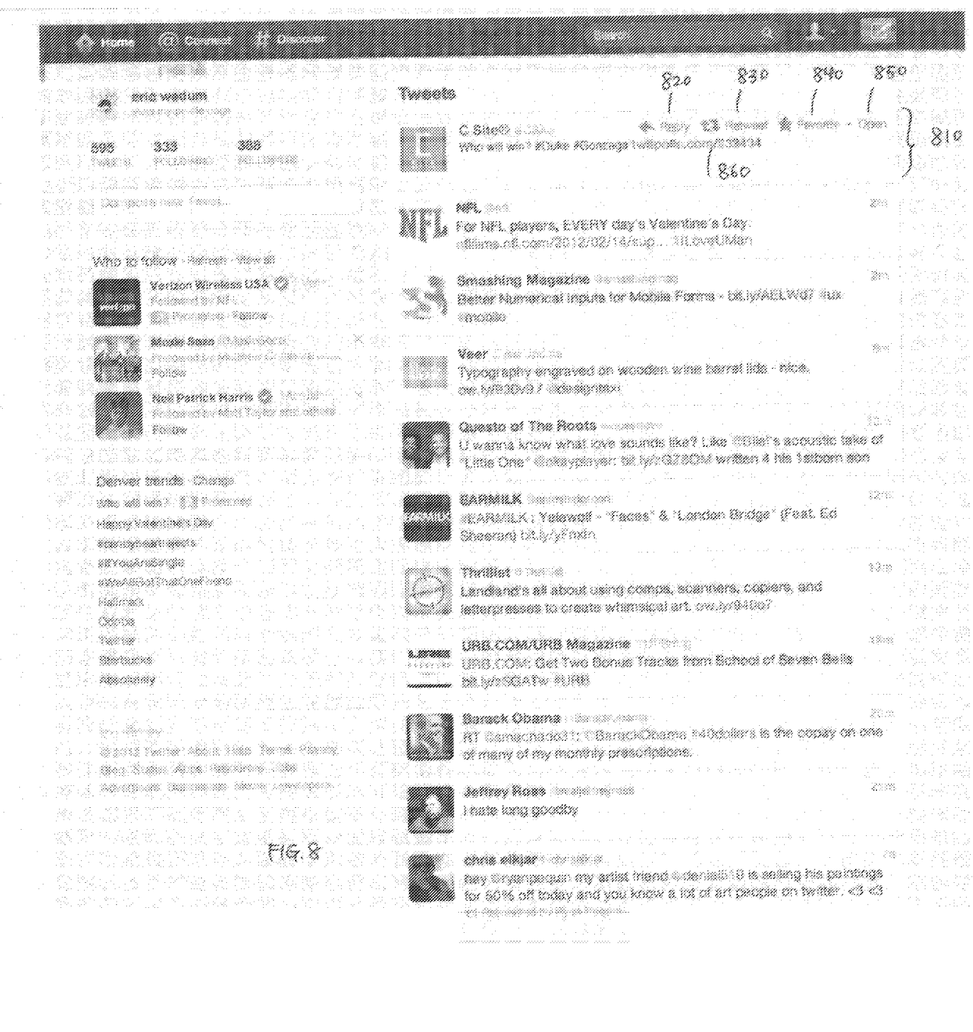
FIG. 8 is a screenshot of a poll that has been posted in an exemplary microblogging website according to one embodiment of the invention.
Figure 9:
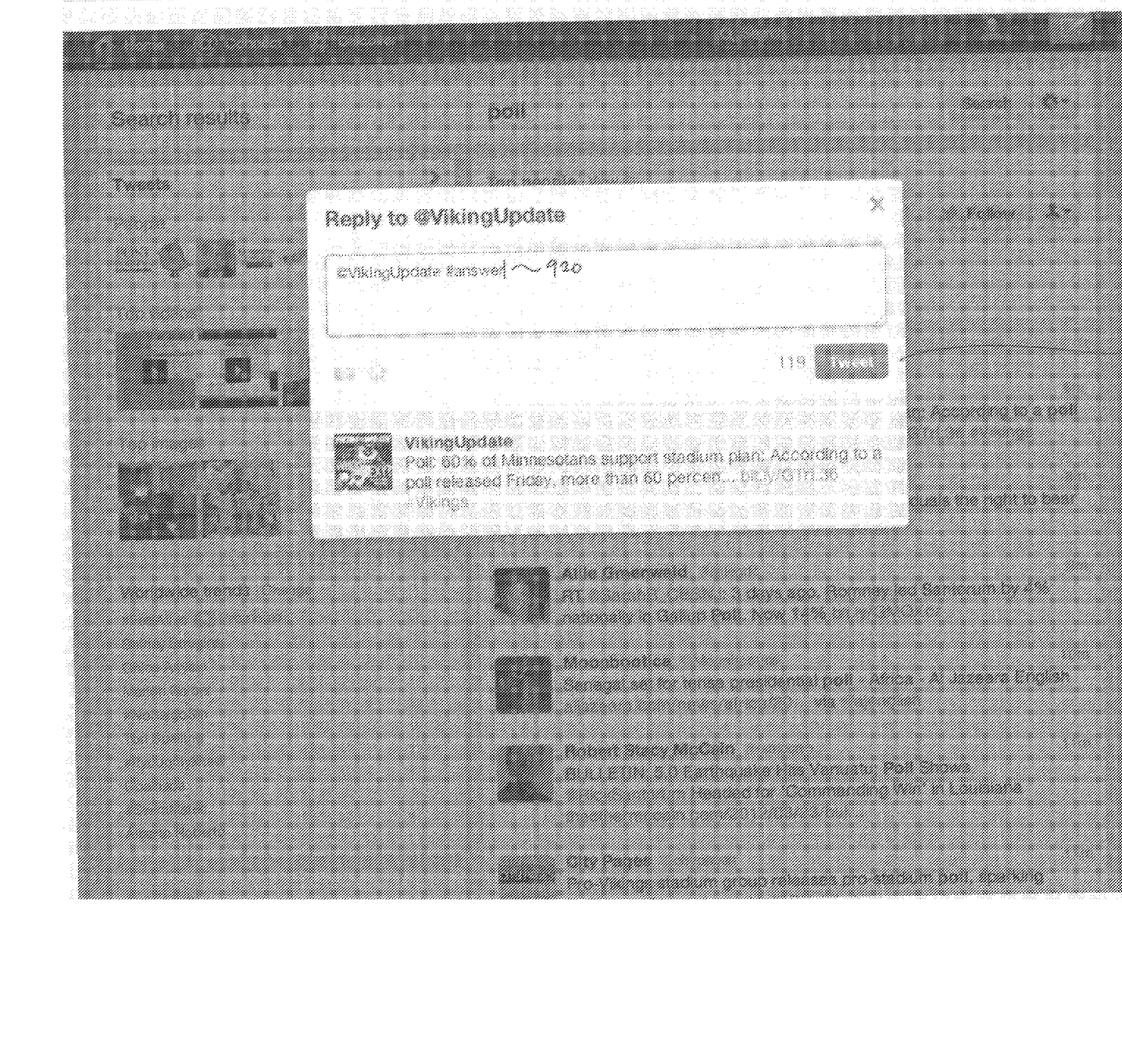
FIG. 9 is a screenshot of a reply field in an exemplary microblogging website according to one embodiment of the invention.

FIGS. 8-9 illustrate screenshots of an exemplary microblogging system website. In this example, the microblogging website is TWITTER. A person skilled in the art would understand that the present invention may be embodied on other user interfaces having more or less functionality within the scope of the present invention. As such, FIGS. 8-9 are intended to be illustrative and not limiting in any way. In FIG. 8, a poll 810 created and posted by C Site appears on Eric Wedum's TWITTER page. He has the option to reply 820 to the post and vote directly within TWITTER, retweet 830 the post to his followers, mark the post as a favorite 840, open the post to get more details 850, or link directly to the poll on the polling system website 860.

FIG. 9 illustrates a screenshot where a user replies to a poll post directly from the microblogging system website. When the user clicks "reply" on the poll post, a reply to field 910 appears as a pop-up window. The user then can reply to the poll post by indicating on the reply post that the reply is for the posting user (i.e., "@username") and that the user elects a certain answer option (i.e., "#answer") 920. As discussed above, once a user votes, he or she may be enabled to view the interim poll results in the original poll post. The user may also be able to view interim poll results on the polling system user interface. When the final poll results have been calculated, a second post with the poll results may then be sent to all the subscribers of the posting user's microblogging account.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, in a polling system, for enabling a user to create polls that are posted on a microblogging website and that can be answered on the microblogging website, the method comprising:
obtaining in the polling system the user's login information for an external microblogging system;
enabling the user to create a poll in the polling system, wherein the polling system provides a user interface via which the user is able to search for a photo to associate with the poll;
generating a microblog post in the polling system for the poll and, in response to the user associating a photo with the poll, such photo is included in the microblog post;
sending the microblog post from the polling system to the microblogging system to post under the user's account on a website associated with the microblogging system, wherein other users on the microblogging system are able to respond to the poll within the microblogging system by replying to the user's microblog post with another post that includes a response to the poll;
sending a query from the polling system to the microblogging system for posts directed to the user;
receiving in the polling system the requested posts from the microblogging system;
parsing the requested posts in the polling system to obtain poll responses;

aggregating in the polling system the poll responses from the requested posts to calculate poll results;

creating a second microblog post in the polling system with the poll results; and sending the second microblog post from the polling system to the microblogging system to post under the user's account in the microblogging website.

2. The method of claim 1, wherein the poll includes a plurality of answer options and generating a microblog post further comprises associating a subject matter marker for the microblogging system with each answer option.

3. The method of claim 2, wherein generating a microblog post further comprises converting any multi-word answer options into one term by removing spaces between words in the answer options.

4. The method of claim 2, wherein enabling the user to create a poll further comprises enabling the user to set a duration for the poll, and wherein parsing the requested posts comprises identifying posts that are sent to the user within the duration of the poll and that include one of the answer options and a corresponding subject matter marker.

5. The method of claim 4, wherein, after the poll is posted, the polling system periodically queries the microblogging system for responses to the poll until the poll is expired.

6. The method of claim 5, wherein the second microblog post is sent after the expiration of the poll and includes the final poll results.

7. The method of claim 6, wherein interim poll results are posted on a website associated with the polling system prior to the expiration of the poll.

8. The method of claim 6, wherein interim poll results are posted on the microblogging website prior to the expiration of the poll.

9. The method of claim 1, wherein poll results are calculated based on the aggregate poll responses obtained from both the parsed posts and any other site on which users can respond to the poll.

10. The method of claim 1, wherein the polling system provides a user interface via which a second user is able to re-post the poll under the second user's account in the microblogging system.

11. The method of claim 10, wherein, in response to the second user electing to re-post the poll, the polling system resends the microblog post to the microblogging system to post under the second user's account in the microblogging system.

12. The method of claim 1, wherein the user interface also enables the user to search for a video to associate with the poll and, in response to the user associating a video with the poll, such video is included in the microblog post.

13. The method of claim 1, wherein the user interface also enables the user to search for an audio file to associate with the poll and, in response to the user associating an audio file with the poll, such audio file is included in the microblog post.

14. A method for enabling a user to create questions that are posted on a microblogging website and that can be answered on the microblogging website, the method comprising:

obtaining in the polling system the user's login information for an external microblogging system;

enabling the user to create a question in the polling system, wherein the polling system provides a user interface via which the user is able to search for a photo to associate with the question;

generating a microblog post in the polling system for the question and, in response to the user associating a photo with the question, such photo is included in the microblog post;

sending the microblog post from the polling system to the microblogging system to post under the user's account on a website associated with the microblogging system, wherein other users on the microblogging system are able to respond to the question within the microblogging system by replying to the user's microblog post with another post that includes an answer;

sending a query from the polling system to the microblogging system for responses to the question, wherein every answer is associated with a subject matter marker;

receiving in the polling system response information from the microblogging system;

parsing the response information in the polling system to obtain answers associated with the subject matter markers;

aggregating in the polling system the answers associated with the subject matter markers from the response information to calculate answer results;

creating a second microblog post in the polling system with the answer results; and sending the second microblog post from the polling system to the microblogging system to post under the user's account in the microblogging website.

15. The method of claim 14, wherein the question is a multiple-choice question.

16. The method of claim 14, wherein the question is a request for a rating of a subject matter between a first number and a second number.

17. The method of claim 14, wherein the question is open-ended.

18. One or more non-transitory computer-readable media comprising computer program code that, when executed by a computer system, enables the computer system to perform the following method for enabling a user to create polls that are posted on a microblogging website and that can be answered on the microblogging website, the method comprising:

obtaining in the polling system the user's login information for an external microblogging system;

enabling the user to create a poll in the polling system, wherein the polling system provides a user interface via which the user is able to search for a photo to associate with the poll;

generating a microblog post in the polling system for the poll and, in response to the user associating a photo with the poll, such photo is included in the microblog post;

sending the microblog post from the polling system to the microblogging system to post under the user's account on a website associated with the microblogging system, wherein other users on the microblogging system are able to respond to the poll within the microblogging system by replying to the user's microblog post with another post that includes a response to the poll;

sending a query from the polling system to the microblogging system for posts directed to the user;

receiving in the polling system the requested posts from the microblogging system;

parsing the requested posts in the polling system to obtain poll responses;

aggregating in the polling system the poll responses from the requested posts to calculate poll results;

creating a second microblog post in the polling system with the poll results; and sending the second microblog post from the polling system to the microblogging system to post under the user's account in the microblogging website.

19. The one or more non-transitory computer-readable media of claim 18, wherein the poll includes a plurality of answer options and generating a microblog post further comprises associating a subject matter marker for the microblogging system with each answer option.

20. The one or more non-transitory computer-readable media of claim 19, wherein enabling the user to create a poll further comprises enabling the user to set a duration for the poll, and wherein parsing the requested posts comprises identifying posts that are sent to the user within the duration of the poll and that include one of the answer options and a corresponding subject matter marker.

21. A computer system for enabling a user to create polls that are posted on a microblogging website and that can be answered on the microblogging website, the system comprising:

a processor;

a memory coupled to the processor, wherein the memory stores instructions that, when executed by the processor, causes the system to perform the operations of:

obtaining in the polling system the user's login information for an external microblogging system;

enabling the user to create a poll in the polling system wherein the polling system provides a user interface via which the user is able to search for a photo to associate with the poll;

generating a microblog post in the polling system for the poll and, in response to the user associating a photo with the poll, such photo is included in the microblog post;

sending the microblog post from the polling system to the microblogging system to post under the user's account on a website associated with the microblogging system, wherein other users on the microblogging system are able to respond to the poll within the microblogging system by replying to the user's microblog post with another post that includes a response to the poll;

sending a query from the polling system to the microblogging system for posts directed to the user;

receiving in the polling system the requested posts from the microblogging system;

parsing the requested posts in the polling system to obtain poll responses;

aggregating in the polling system the poll responses from the requested posts to calculate poll results;

creating a second microblog post in the polling system with the poll results; and sending the second microblog post from the polling system to the microblogging system to post under the user's account in the microblogging website.

22. The computer system of claim 21, wherein the poll includes a plurality of answer options and generating a microblog post further comprises associating a subject matter marker for the microblogging system with each answer option.

23. The computer system of claim 22, wherein enabling the user to create a poll further comprises enabling the user to set a duration for the poll, and wherein parsing the requested posts comprises identifying posts that are sent to the user within the duration of the poll and that include one of the answer options and a corresponding subject matter marker.

* * * * *